July 20, 1937.  A. C. FISCHER  2,087,248
COMPOSITION SHEET
Filed Feb. 15, 1932

Inventor:
Albert C. Fischer,
By Albert F. Robinson Atty.

Patented July 20, 1937

2,087,248

UNITED STATES PATENT OFFICE 2,087,248

COMPOSITION SHEET

Albert C. Fischer, Chicago, Ill.

Application February 15, 1932, Serial No. 593,031

3 Claims. (Cl. 154—44)

This invention relates to compressible and elastic composition sheets which are of a character to provide thermal insulating, sound deadening and shock absorbing qualities, thereby making them especially suitable for use as automobile, building and refrigerator linings, upholstery for seats, typewriter mats, rug cushions, and the like.

Generally described, the invention comprises an elastic sheet, such as sponge rubber, which is molded from a plastic mass with a series of relatively small recesses in one or both faces. Or the sheet may be formed from fibrous material or the like, and then have the relatively small recesses stamped in or cut from the faces. The recesses function to break up sound, and the ridges are adapted to absorb the shocks. Where the sheets are formed from sponge rubber, there is a variation in the rigidity of the back portion which is sponged horizontally and the ridges which are sponged vertically during the process of vulcanization. The ridge portions, sponged vertically, have a much greater resistance to vertical compressing forces, and accordingly serve better to sustain loads. This quality of vertical rigidity may be increased to maximum degree by making the recesses relatively small, yet of some appreciable size.

For a better understanding of the invention, reference may be made to the accompanying drawing, in which.

Figure 1:
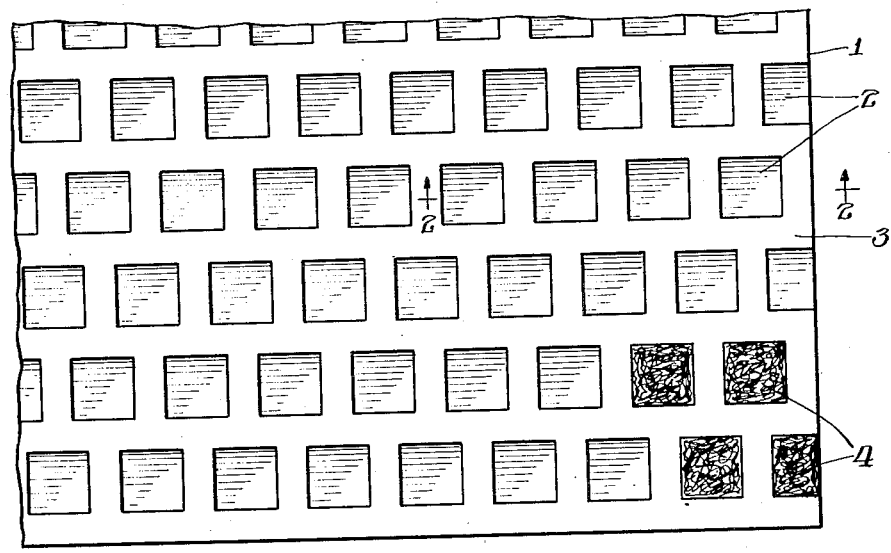
Fig. 1 is a plan view of a sheet embodying the invention.
Figure 2:
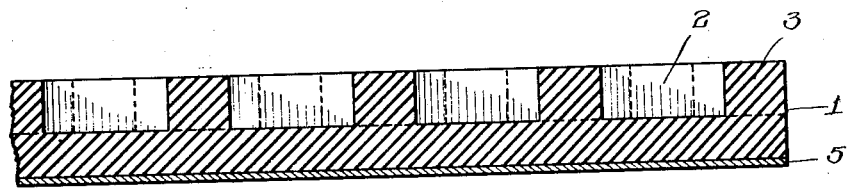
Fig. 2 is a sectional view taken on lines 2—2 of Fig. 1.

In the drawing, numeral 1 designates a sheet of sponged rubber having formed in one face a series of recesses 2 separated by ridges 3. I have found that these recesses should preferably be about one-half inch square and about one-fourth inch deep, and the ridges should be about one-fourth inch wide for most efficient use as an acoustical and insulating sheet. As may be seen from Figure 2 of the drawing, the recesses are of a depth extending approximately half way through the sheet, and since, as previously stated, the recesses are about one-fourth inch deep, it follows that the sheet is about one-half inch thick.

For some uses, it may be preferable to have the recesses filled with cellular material 4, such as, ground cork, diatomaceous earth, magnesia, asbestos fiber, mineral wool, or the like, made up into pieces adapted to be inserted and cemented in place or poured therein. As both faces of the sheet may be provided with recesses, so, too, either or both of the opposite recesses may or may not, as desired, be filled with the cellular material. Or the recesses may be enclosed with a facing strip, such as, metal foil, applied to cover them and provide dead air spaces.

For some uses, it may be desirable to provide one side of the sheet with a more finished appearance, as, for example, in the case of table tops and the like. This may be accomplished by facing one side, preferably the non-recessed side if the recesses are formed in only one face, with a felt padding, a polished harder rubber layer, or a polished wood veneer strip 5 or the like, adhered or otherwise secured thereto.

While I have described certain embodiments to typify the invention generally, it will be understood that same is not limited thereby but that there may be various changes without departing from the spirit of the invention.

I claim:

1. An insulating and sound deadening sheet comprising a foundation of sponge rubber having a series of shallow recesses formed on one face, and a strip of metal foil applied to enclose the recesses.

2. An insulating and sound deadening sheet comprising a foundation of sponge rubber having a series of shallow recesses formed on one face, cellular filling material inserted within the recesses, and a strip of metal foil applied to enclose the recesses.

3. An insulating and sound deadening sheet comprising a foundation of sponge rubber having a series of recesses formed on one face, and a strip of metal foil applied to enclose the recesses.

ALBERT C. FISCHER.